US011783407B2

(12) United States Patent
Nguyen et al.

(10) Patent No.: US 11,783,407 B2
(45) Date of Patent: Oct. 10, 2023

(54) CROWD SOURCING LOCATIONS FOR SELLER PRIVACY

(71) Applicant: eBay Inc., San Jose, CA (US)

(72) Inventors: Hieu Van Nguyen, Renton, WA (US); Huy Quang Nguyen, Bellevue, WA (US); Tuan Thanh Phan, Newcastle, WA (US); Hoang Trinh, Mercer Island, WA (US)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 17/859,438

(22) Filed: Jul. 7, 2022

(65) Prior Publication Data

US 2022/0343403 A1 Oct. 27, 2022

Related U.S. Application Data

(63) Continuation of application No. 17/136,602, filed on Dec. 29, 2020, now Pat. No. 11,416,915, which is a (Continued)

(51) Int. Cl.
*G06Q 30/00* (2023.01)
*G06Q 30/0601* (2023.01)
(Continued)

(52) U.S. Cl.
CPC ......... *G06Q 30/0639* (2013.01); *G06F 16/29* (2019.01); *G06Q 10/0832* (2013.01); *G06Q 30/0609* (2013.01); *H04W 4/029* (2018.02)

(58) Field of Classification Search
CPC .......... G06Q 30/0639; G06Q 10/0832; H04W 4/029; G06F 16/29
See application file for complete search history.

(56) References Cited

U.S. PATENT DOCUMENTS 8,737,728 B2 5/2014 Bhardwaj et al.
9,886,653 B2 2/2018 Bhardwaj et al.
(Continued)

FOREIGN PATENT DOCUMENTS

CN 112840370 5/2021
KR 20150110840 10/2015
(Continued)

OTHER PUBLICATIONS

Zhu, Zhichao, and Guohong Cao. “Applaus: A privacy-preserving location proof updating system for location-based services.” 2011 Proceedings IEEE INFOCOM. IEEE, 2011.*
(Continued)

*Primary Examiner* — Kathleen Palavecino
(74) *Attorney, Agent, or Firm* — SCHWEGMAN LUNDBERG & WOESSNER, P.A.

(57) ABSTRACT

Methods and systems for protecting seller privacy during an ecommerce transaction are disclosed. In one aspect, a method includes, receiving, via an online listing configuration interface for a first session, one or more candidate pick up times and specific pick up locations for an item, determining a generalized version of the one or more specific pick up locations, displaying, via a second session, an online listing for the item, displaying, via the second session, the one or more candidate pick up times and the generalized versions of the one or more specific pick up locations, receiving, via the second session, a selection of one of the candidate pick up times and one of the generalized versions of one of the specific pick up locations, in response to receiving payment for the item, displaying a specific pick up location corresponding to the selected one generalized version.

20 Claims, 10 Drawing Sheets

100
102a 102b 102c 102d
104 106a 108 106b 110
Back Checkout
Brown Leather Little Kids Boots Size 10 $ 100.0
Message to Seller
Pick Up at Bellevue, WA 9600-4
Pickup Calender
Item $ 100.0
Tax $ 10.0
TOTAL $ 110.0
CONFORM AND PAY
Monthly Shoes Calender
Available
Pickup Time: Monday, June 11, 9:00AM
Purchased item
Pickup Address 1000 eBay, Awe Selerve WA 9600-4
Pickup Time Monday, June11, 9:00AM
Thank You for Shopping with eBay!
Continue Shopping

Related U.S. Application Data continuation of application No. 16/128,026, filed on Sep. 11, 2018, now Pat. No. 10,902,506.

(51) Int. Cl.

| | |
|---|---|
| ***H04W 4/029*** | (2018.01) |
| ***G06Q 10/0832*** | (2023.01) |
| ***G06F 16/29*** | (2019.01) |

(56) References Cited

U.S. PATENT DOCUMENTS

| | | | |
|---|---|---|---|
| 10,007,690 | B2 | 6/2018 | Finkler |
| 10,185,899 | B2 | 1/2019 | Bhardwaj et al. |
| 10,331,657 | B1 | 6/2019 | Cole et al. |
| 10,332,176 | B2 | 6/2019 | Gadre et al. |
| 10,489,692 | B2 | 11/2019 | Bhardwaj et al. |
| 10,575,127 | B1 | 2/2020 | Ballot et al. |
| 10,740,660 | B2 | 8/2020 | Bhardwaj et al. |
| 11,086,925 | B2 | 8/2021 | Rekhi et al. |
| 11,416,915 | B2 | 8/2022 | Nguyen et al. |
| 2003/0177072 | A1 | 9/2003 | Bared |
| 2004/0153370 | A1 | 8/2004 | Yang |
| 2007/0294127 | A1 | 12/2007 | Zivov |
| 2009/0287596 | A1 | 11/2009 | Torrenegra |
| 2012/0116917 | A1 | 5/2012 | Saul et al. |
| 2013/0083999 | A1 | 4/2013 | Bhardwaj et al. |
| 2013/0084000 | A1 | 4/2013 | Bhardwaj et al. |
| 2015/0058079 | A1 | 2/2015 | Freund et al. |
| 2015/0058083 | A1 | 2/2015 | Herrero |
| 2015/0186977 | A1 | 7/2015 | Leonard et al. |
| 2015/0227972 | A1 | 8/2015 | Tang |
| 2016/0063588 | A1 | 3/2016 | Gadre et al. |
| 2016/0092484 | A1 | 3/2016 | Finkler |
| 2016/0224532 | A1 | 8/2016 | Miller et al. |
| 2016/0328432 | A1 | 11/2016 | Raghunathan |
| 2017/0169535 | A1 | 6/2017 | Tolkin et al. |
| 2017/0186066 | A1 | 6/2017 | Bruch |
| 2017/0323185 | A1 | 11/2017 | Bhardwaj et al. |
| 2017/0330144 | A1 | 11/2017 | Wakim et al. |
| 2018/0089188 | A1 | 3/2018 | Kharisma et al. |
| 2018/0089289 | A1 | 3/2018 | Zhang et al. |
| 2018/0101917 | A1 | 4/2018 | Fujita |
| 2019/0114515 | A1 | 4/2019 | Bhardwaj et al. |
| 2019/0155802 | A1 | 5/2019 | Miller et al. |
| 2019/0155803 | A1 | 5/2019 | Miller et al. |
| 2019/0266654 | A1 | 8/2019 | Gadre et al. |
| 2020/0082462 | A1 | 3/2020 | Nguyen et al. |
| 2020/0097568 | A1 | 3/2020 | Rekhi et al. |
| 2020/0387763 | A1 | 12/2020 | Bhardwaj et al. |
| 2021/0118041 | A1 | 4/2021 | Nguyen et al. |

FOREIGN PATENT DOCUMENTS

| | | |
|---|---|---|
| KR | 20160013496 | 2/2016 |
| WO | 2016012741 | 1/2016 |
| WO | 2020055502 | 3/2020 |
| WO | 2020068241 | 4/2020 |

OTHER PUBLICATIONS

"International Application Serial No. PCT US2019 040295, International Search Report dated Nov. 14, 2019", 4 pgs.

"International Application Serial No. PCT US2019 040295, Written Opinion dated Nov. 14, 2019", 7 pgs.

"International Application Serial No. PCT US2019 041108, International Search Report dated Nov. 27, 2019", 3 pgs.

"International Application Serial No. PCT US2019 041108, Written Opinion dated Nov. 27, 2019", 5 pgs.

"U.S. Appl. No. 16/140,305, Non Final Office Action dated May 15, 2020", 20 pgs.

"U.S. Appl. No. 16/128,026, Non Final Office Action dated Jul. 8, 2020", 11 pgs.

"U.S. Appl. No. 16/128,026, Examiner Interview Summary dated Aug. 12, 2020", 3 pgs.

"U.S. Appl. No. 16/140,305, Examiner Interview Summary dated Aug. 14, 2020", 3 pgs.

"U.S. Appl. No. 16/128,026, Notice of Allowance dated Sep. 21, 2020", 7 pgs.

"U.S. Appl. No. 16/140,305, Final Office Action dated Dec. 24, 2020", 23 pgs.

"International Application Serial No. PCT US2019 041108, International Preliminary Report on Patentability dated Mar. 25, 2021", 8 pgs.

"International Application Serial No. PCT US2019 040295, International Preliminary Report on Patentability dated Jan. 14, 2021", 9 pgs.

"U.S. Appl. No. 16/140,305, Notice of Allowance dated Apr. 7, 2021", 10 pgs.

"U.S. Appl. No. 17/136,602, Notice of Allowance dated Apr. 4, 2022", 11 pgs.

"U.S. Appl. No. 17/136,602, 312 Amendment filed Jul. 1, 2022", 8 pgs.

Zhu, Zhichao, "Applaus: A privacy-preserving location proof updating system for location-based services", Proceedings IEEE INFOCOM. IEEE, (2011).

U.S. Appl. No. 16/128,026 U.S. Pat. No. 10,902,506, Sep. 11, 2018, Crowd Sourcing Locations for Seller Privacy.

U.S. Appl. No. 17/136,602 U.S. Pat. No. 11,416,915, Dec. 29, 2020, Crowd Sourcing Locations for Seller Privacy.

U.S. Appl. No. 16/140,305 U.S. Pat. No. 11,086,925, Sep. 24, 2018, Fashion by Trend User Interfaces.

* cited by examiner

200

Select Pick Up Location Choices for:
"Brown Leather Little Kids Boots" Size 10

201

| Pick Up Location(s) | General Description of Pick-Up Location |
|---|---|
| 2025 Hamilton Avenue, San Jose, California 95125 | North San Jose |
| 9 Great Oaks Blvd, San Jose, California | South San Jose |
| 2211 North First Street, San Jose, Ca 95131 | Downtown San Jose |
| | |

202a 202b 204a 204b

OK Cancel

FIG. 2

CROWD SOURCING LOCATIONS FOR SELLER PRIVACY

CROSS REFERENCE TO RELATED APPLICATIONS

This application is a continuation of and claims priority to U.S. patent application Ser. No. 17/136,602, filed Dec. 29, 2020, which is a continuation of and claims the benefit of priority to Ser. No. 16/128,026, filed Sep. 11, 2018, issued as U.S. Pat. No. 10,902,506 on Jan. 26, 2021, each of which is hereby incorporated by reference in its entirety.

TECHNICAL FIELD

The present disclosure generally relates to privacy protection in an electronic environment. In particular, the present disclosure is directed to user interfaces for crowd sourcing of location information, ecommerce.

BACKGROUND

Concerns about privacy when operating in an electronic environment have been increasing over the past several years. The Internet environment has made personal identification information (PII) much more accessible to nefarious actors, resulting in an increase in identity theft, both electronic and real-world stalking, and other undesirable results. Thus, improved methods of protecting PII in a networked environment are needed.

BRIEF DESCRIPTION OF THE DRAWINGS

Various ones of the appended drawings merely illustrate example embodiments of the present disclosure and cannot be considered as limiting its scope.

FIG. 2 shows a user interface that may be presented to a seller of an item within a listing system.

DETAILED DESCRIPTION

Figure 1:
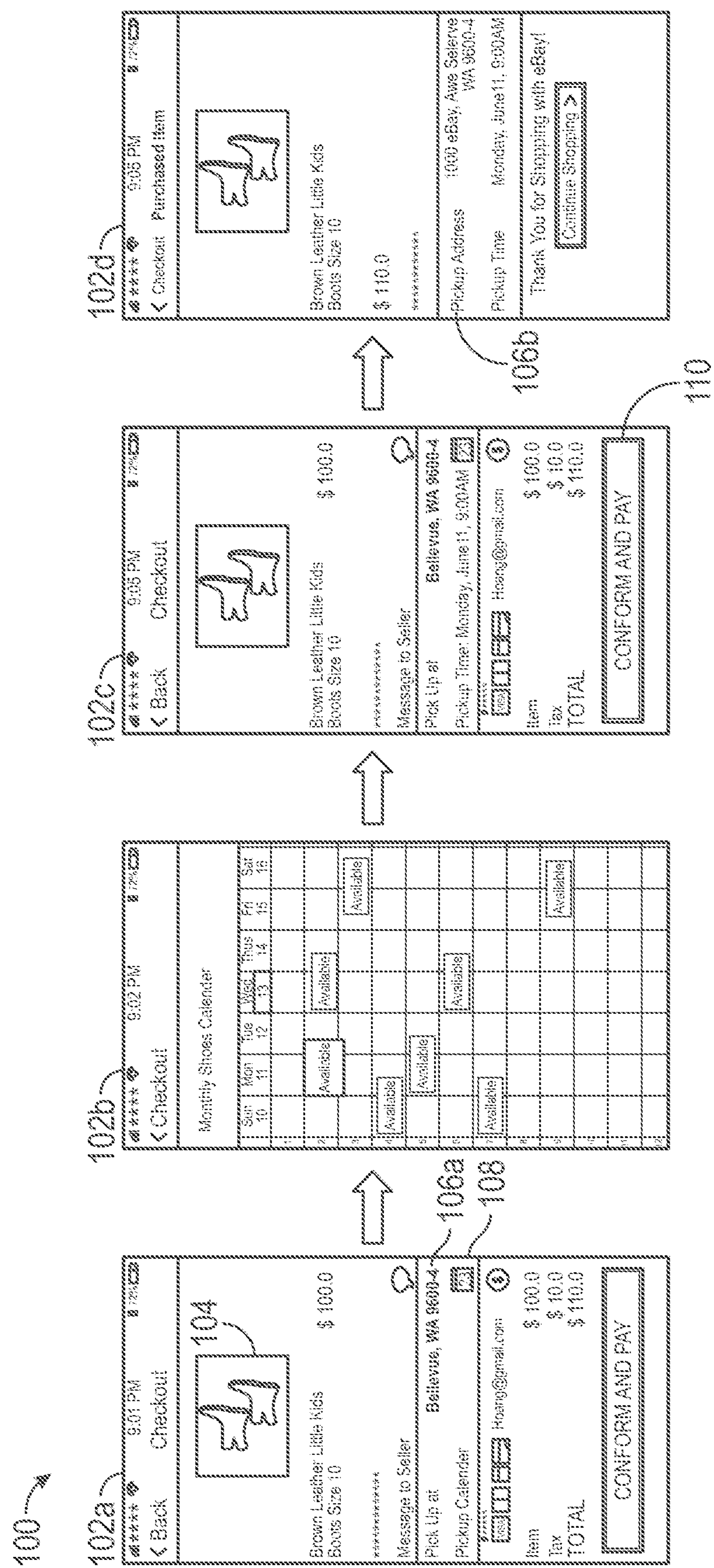
FIG. 1 shows a user interface sequence that may be implemented by one or more embodiments of this disclosure.

Reference will now be made in detail to specific example embodiments for carrying out the inventive subject matter. Examples of these specific embodiments are illustrated in the accompanying drawings. It will be understood that these examples are not intended to limit the scope of the claims to the illustrated embodiments. On the contrary, they are intended to cover alternatives, modifications, and equivalents as may be included within the scope of the disclosure. In the following description, specific details are set forth in order to provide a thorough understanding of the subject matter. Embodiments may be practiced without some or all of these specific details.

Electronic transactions provide many benefits to both buyers and sellers. Buyers are able to select from a broad range of products that can be delivered to their door without the need to physically visit brick and mortar stores. Sellers are provided with access to a larger set of consumers than could be reached via physical stores and at vastly reduced cost. While ecommerce has been successful with new goods shipped from far away locations and relatively expensive used goods, local transactions for small items are often purchased outside of an ecommerce environment. For example, classified advertisements and their online equivalents allow buyers to find local items, but the transaction itself typically occurs outside of the electronic environment, and may include the exchange of cash between buyer and seller. Thus, further improvements to ecommerce systems are needed to provide for increased penetration of ecommerce into local transactions.

As discussed above, local transactions may be accomplished in a number of ways, including via ecommerce, via classified advertisements, or their online equivalents. One barrier to capturing more local transactions via ecommerce is the relative proximity of buyers and sellers may inhibit some sellers from revealing details such as their address out of privacy concerns. For example, publishing information that particular items are present at particular locations may invite nefarious individuals to visit the location in an attempt to obtain the item without consummating a consensual transaction.

The disclosed embodiments provide for a progressive transfer of information from a seller to a buyer as a trust level of seller for the buyer increases. The progressive transfer of information also facilitates the buyer's need to obtain some information on a pick up location for a product offered for sale by the seller. For example, in a large metro area such as a city, knowing that an item may be picked up from somewhere in the city may not sufficiently inform the buyer as to a level of convenience of purchasing the item. Some locations may be vastly more convenient than others within a metropolitan area. Geographic distance, traffic conditions, a level of safety associated with particular neighborhoods may all influence a buyer's decision whether to purchase an item. Thus, the disclosed embodiments provide information to a buyer considering an item purchase. These embodiments also protect seller privacy by refraining from revealing specific pick-up locations for items, and instead provide a more generalized description of a neighborhood or region that allows the buyer to assess the relative convenience of a purchase of the item without knowing the specific location.

For example, a specific location such as 2025 Hamilton Avenue, in San Jose Calif. may be described as North San Jose, Near Bascom/Hamilton, and/or Pamlar Borello. The disclosed embodiments allow a seller to describe their specific location in more general terms, thus obscuring the specific location and protecting seller privacy, while still providing a buyer with information necessary to determine if a pick up location for an item is convenient for them. The general description of the location is provided to the buyer until after the buyer pays for the item and arranges a pick-up time. The specific location (e.g., an address) is then revealed to the buyer.

One challenge with obtaining generic descriptions of specific locations from sellers is that different sellers from a similar location may describe the location in different manners. Thus, a buyer purchasing items in a particular location may be exposed to relatively ad-hoc descriptions that vary across multiple sellers, resulting in a less seamless and clear communication of pick up locations. To mitigate this challenge, some of the disclosed embodiments provide for crowd sourcing of generalized descriptions of particular areas. For example, similar or identical descriptions provided by sellers located within a proximity of each other may be ranked above descriptions used less frequently by sellers. If a particular general description is used by sellers more than a threshold number of times, the general description may be offered as a suggestion to a seller as a way to more generally describe their specific location when the seller is configuring pick up locations. This may lead to greater consistency across the metropolitan area for description sub-regions or neighborhoods.

FIG. 1 shows a user interface sequence 100 that may be implemented by one or more embodiments of this disclosure. The user interface sequence 100 includes four user interfaces 102*a-d*. A first user interface 102*a* shows an example checkout dialog. The checkout dialog 102*a* is displayed after a buyer agrees to purchase an item. The dialog 102*a* shows an item 104 that has been chosen for purchase by the buyer, a general pick up location 106*a*, and a control 108 configured to activate a calendar control.

User interface 102*b* is a calendar control that is displayed upon selection of the control 108 of user interface 102*a*. The calendar control 102*b* is configured to provide a calendar of dates and times from which the buyer may select. The selected date/time will be a pick up date/time of the purchased item 104 from the pick up location 106. After the date/time for the pick up has been selected via the calendar control 102*b*, the user interface sequence 100 returns to the checkout user interface 102*c*. Upon selection of the confirm and pay button 110, the user may pay for the item, for example, via a user interface that allows entry of payment information such as a credit card or a PayPal email address. This user interface is not shown in FIG. 1. Once the payment process is complete, the user interface sequence 100 moves to the purchased item user interface 102*d*. The purchased item user interface 102*d* shows a specific pick up address 106*b*. Note that the general location 106*a* is a generic description of the specific pick up address 106*b*. The general location 106*a* does not reveal a specific location of the seller, and thus preserves seller privacy. Specific pick up address 106*b* does provide a more specific location, enabling the buyer to identify the exact location from where the item 104 will be picked up.

FIG. 2 shows a user interface that is presented to a seller of an item within a listing system. The user interface 200 shows a scrollable edit box 201 that includes two columns. A first column 202*a* provides for entry of one or more specific pick up locations for an item. An example specific pick up location is shown as 204*a*. Specific pick up location 106*b* discussed above with respect to FIG. 1 is another example of a specific pick up location. The specific pick up locations uniquely identifies a location where the item may be picked up. Examples of specific locations include complete postal addresses that provide for the delivery of packages via the US postal service, although specific locations are not necessarily limited to this example. In some aspects, a specific location identifies a geographic location within a predefined distance range, with the general location only identifying the geographic location within a larger distance range. For example, the specific location may identify a location within five (5) feet or ten (10) feet, whereas a general pick up location (e.g. 106*a*) identifies a location with a larger radius. In some aspects, the specific location identifies a street number, unit number, suite number, or an apartment number of the pick up location, whereas a general pick up location does not. In other words, the specific address may identify a specific dwelling or specific office, and may not provide for the inclusion of multiple dwellings or office locations to qualify as the specific location.

A second column 202*b* allows entry of a general pick-up location, which is a less specific or more general description of the specific location. For example, FIG. 2 illustrates general pick up location 204*b*, which is a generalized version of specific pick up location 204*a*. A general location may identify a neighborhood, subdivision, community, district, region, or general vicinity in which the specific location is located. Multiple dwellings and/or individual office locations may be described by the general location specified in column 202*b*, including the specific location indicated in column 202*a*. User interface 200 allows a seller of an item to enter both a specific location in column 202*a* and a generalized description of the specific location in column 202*b*. The general location entered in column 202*b* may then appear, for example, as location 106*a*. The specific location entered in column 202*a* may then appear as location 106*b*.

Figure 3:
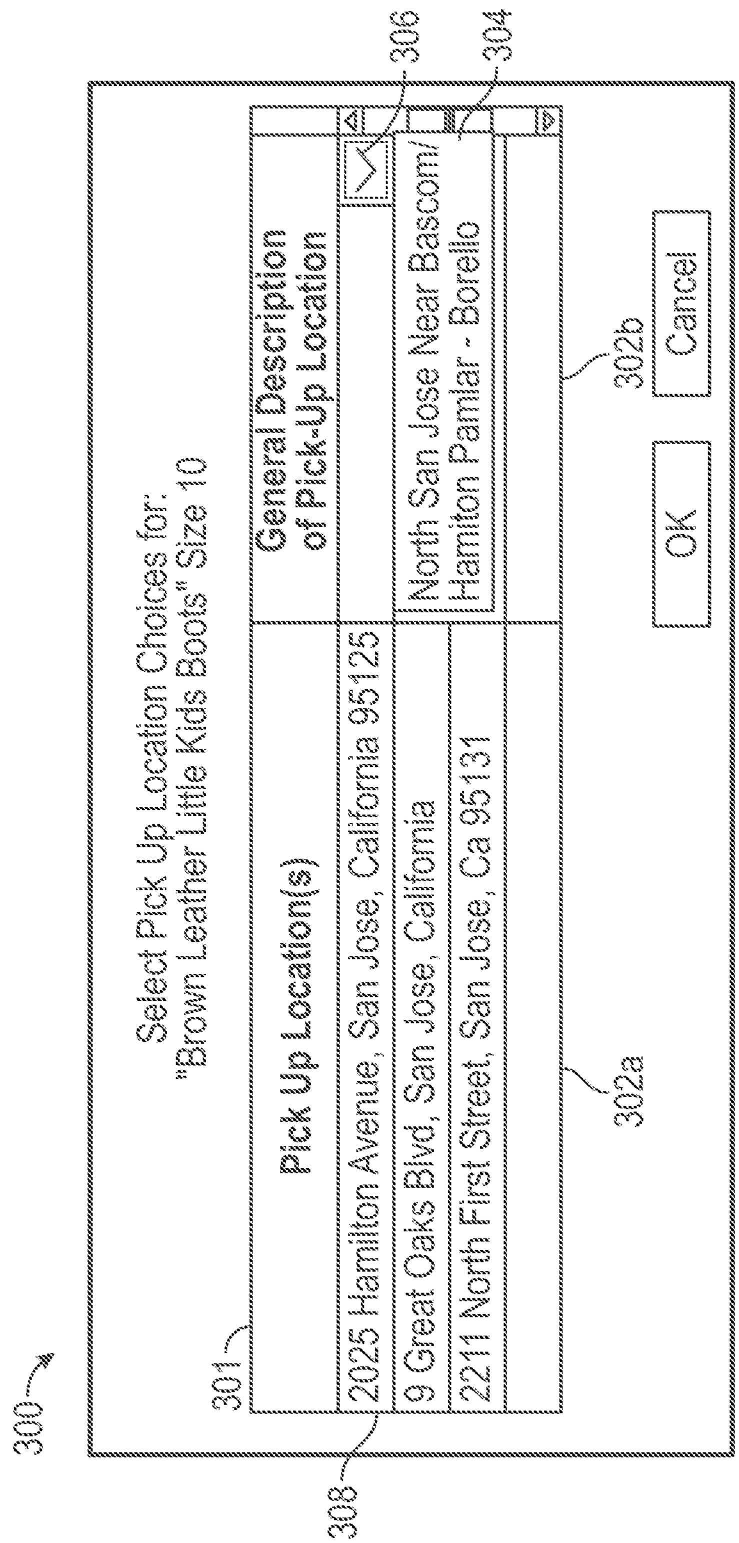
FIG. 3 shows another embodiment of a user interface that may be implemented by at least some of the disclosed embodiments

FIG. 3 shows another embodiment of a user interface 300 that is implemented by at least some of the disclosed embodiments. The user interface 300 shown in FIG. 3 includes a scrollable control 301, which includes two columns 302*a* and 302*b*. The embodiment of FIG. 3 includes a drop down control 304 in each row of the control 301, which provides suggested general locations 306 for specific locations indicated in column 302*a*. In some aspects, the suggestions 306 may be obtained by crowd sourcing locations. The crowd sourced locations may be provided by multiple sellers. These multiple sellers may have previously used pick up locations within the same general area as a specific location in column 302*a* (e.g., specific location 308).

Figure 4:
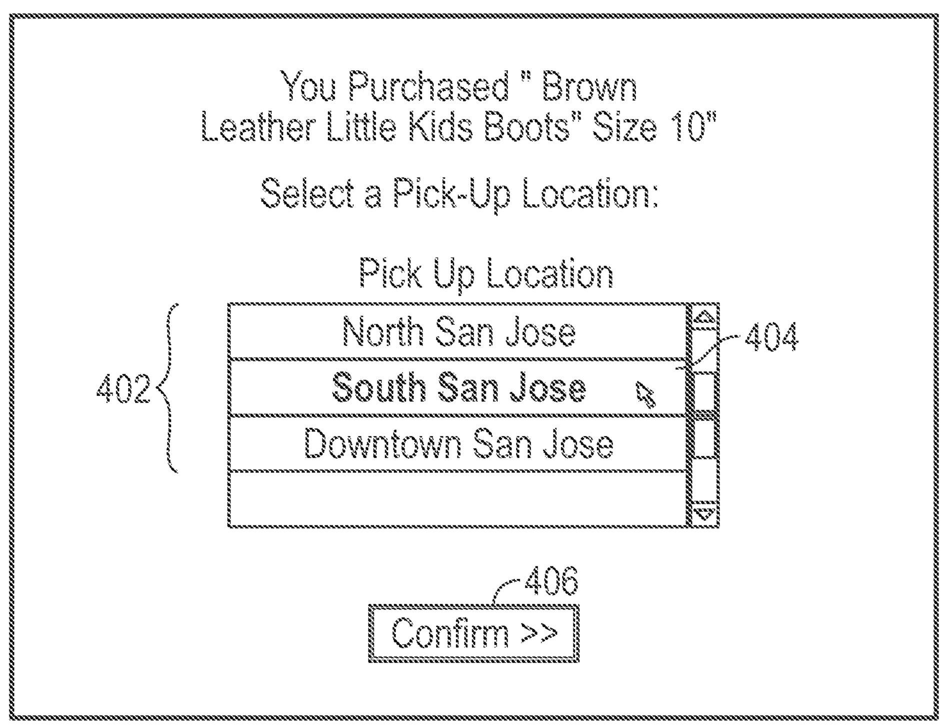
FIG. 4 shows an example user interface that may be implemented by at least some of the disclosed embodiments.

FIG. 4 shows an example user interface that is implemented by at least some of the disclosed embodiments. FIG. 4 shows a user interface 400 that provides for selection of a pick up location. A choice of general locations 402 is shown in the user interface 400. These general locations 402 may be obtained from the general locations of column 202*b* or 302*b* entered by a seller via the user interface 200 or 300 discussed above with respect to FIGS. 2 and/or 3. A selection 404 of a general location 402 is reflected in the pick up location choice 106*a* displayed in the user interface 102*a*, discussed above with respect to FIG. 1. In some embodiments, the selected pick up location is applied upon selection of the confirm button 406. For example, the selected pick up location may be inserted as pick up location 106*a* in FIG. 1, user interface 102*a*.

Figure 5:
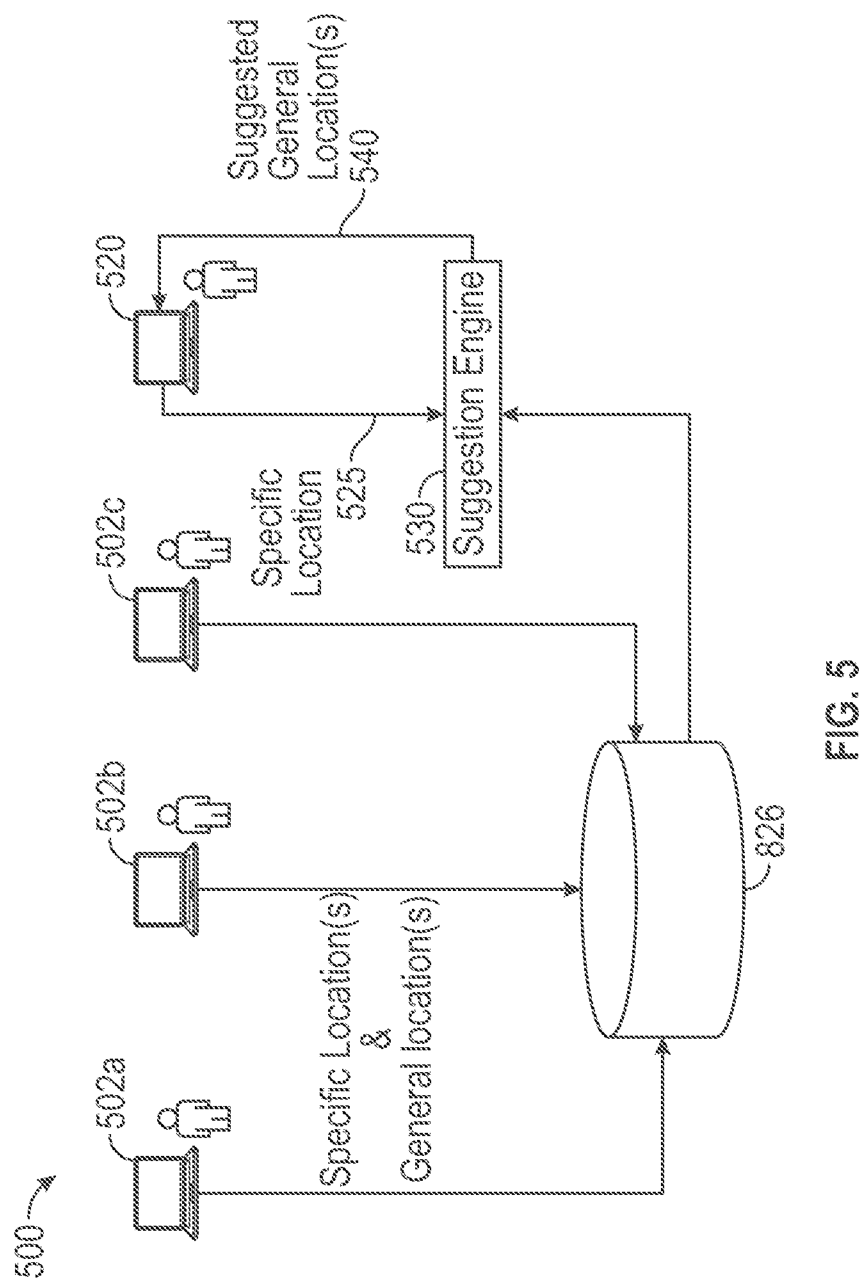
FIG. 5 shows a data flow diagram of a process for crowd sourcing general location suggestions that may be implemented by at least some of the disclosed embodiments.

FIG. 5 shows a data flow diagram of a process for crowd sourcing general location suggestions that is implemented by at least some of the disclosed embodiments. FIG. 5 shows a plurality of user terminals 502*a-c*. The users terminals 502*a-c* have established different sessions with on online marketplace based on different authentication credentials. The authentication credentials may identify accounts that are indicated as being seller accounts for sellers in the online marketplace. As discussed above, sellers associated with each of the user sessions provide general locations of pick up locations for specific locations via user interface 200 and/or 300, discussed above with respect to FIGS. 2 and 3. Both the general locations and specific locations are stored in a database (e.g., database 826). Subsequently, another user, user 520, enters a specific location 525. The user 520 may also be a seller operating within the online marketplace. The specific location 525 may be a location entered into the column 202*a*, discussed above with respect to FIGS. 2 and/or column 302*a*, discussed above with respect to FIG. 3. An example of such a specific location is specific location 204*a*. A suggestion engine 530 searches the database 826 for other specific locations within a predefined distance of the specific location 525. The suggestion engine 530 determines that some of the general locations stored in the database 826 may be appropriate to suggest to the user 520 based on the specific location 525. For example, if a general location provided by one or more of the users 502*a* occurs a sufficient number of times (e.g. more than a threshold number of times) for other specific locations within a predefined distance from the specific location 525, the suggestion engine 530 determines that this general location should be suggested to the user 520 as suggested general location 540.

Figure 6:
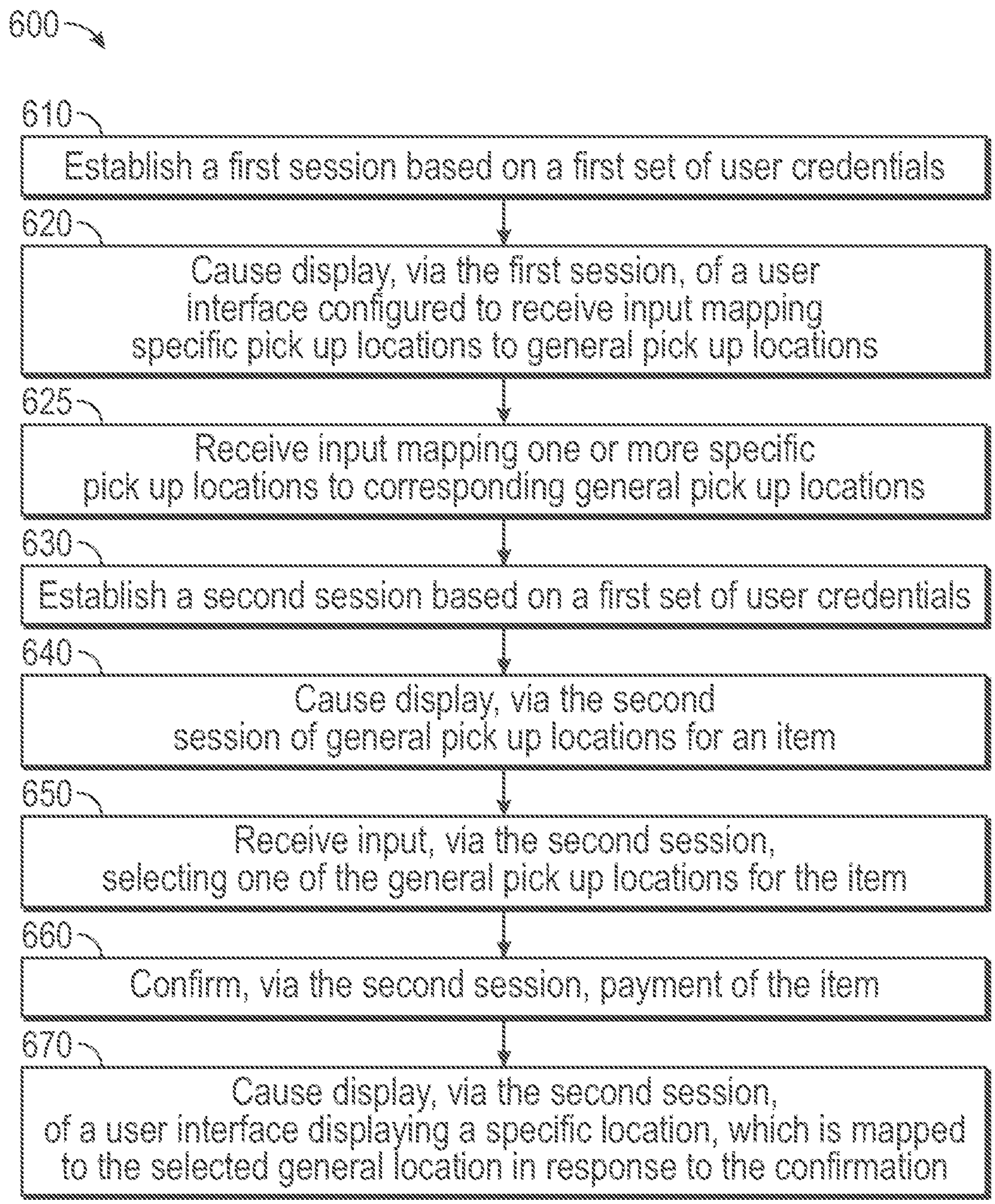
FIG. 6 is a flowchart of a method for completing an ecommerce transaction.

FIG. 6 is a flowchart of a method 600 for completing an ecommerce transaction. In some aspects, one or more of the functions discussed below with respect to FIG. 6 may be performed by the machine 1000 of FIG. 10. For example, instructions 908 and/or 1016 configure one or more hardware processors 906/1010 to perform one or more of the functions discussed below with respect to method 600 and FIG. 6. In some aspects, one or more of the functions discussed below are performed by instructions stored in the suggestion engine 530.

Operation 610 establishes a first session based on a first set of user credentials. The user credentials include one or more of a user name and a password. The credentials identify a user account associated with the credentials. User account information may identify the account as a seller account. In some aspects, particular user interfaces are displayed to sellers but not to buyers, and vis-versa.

Operation 620 causes display, via the first session, a user interface. The user interface is displayed, at least in part, in response to the user account identifying the user as a seller. The user interface is configured to receive input mapping one or more specific pick up locations to one or more corresponding general pick up locations. For example, the user interface 200 and/or 300 is configured to receive input defining specific pick up locations in columns 202*a* (e.g., specific pick up location 204*a*) and 302*a* respectively, and general pick up locations in column 202*b* (e.g., general location 204*b*) and 302*b* respectively.

In operation 625, input is received mapping one or more specific pick up locations to corresponding general pick up locations. In some aspects, data derived from the input is stored in a database, such as the database 826. For example, input is received in column 202*a* and 302*a* of user interfaces 200 or 300. The input in column 202*a* or 302*a* define a specific location. Input is also received in column 202*b* or 302*b* that define a general pick up location. Correspondence between a specific location in column 202*a*/302*a* and a general location in column 202*b*/302*b* establishes the mapping. For example, a specific location and a general location in a same row of the scrollable control 201 and/or 301 are mapped to each other. The mapping between specific locations and general locations may be stored in a database, such as the database 826 discussed above.

In some aspects, operation 620 displays suggestions for a generalized location when a specific location is inputted. For example, as shown in FIG. 3, the suggestions 306 are displayed for the specific location 308. In some aspects, the suggestions are obtained via a suggestion engine (e.g., suggestion engine 530), which performs one or more of the functions discussed below with respect to method 700 and FIG. 7.

Operation 630 establishes a second session based on a second set of user credentials. The second set of user credentials include one or more of a user name and/or password, and may be associated with a second user account. The second user account may be a buyer account. The second user account may have purchased the item.

Operation 640 causes display, via the second session, of the general pick up locations in a second user interface. For example, in some aspects, operation 640 causes display of a (second) user interface similar to user interface 400, discussed above with respect to FIG. 4. For example, in these embodiments, operation 640 displays one or more general pick up locations 402 for an item.

Operation 650 receives, via the second session, a selection of one of the general pick up locations. For example, as illustrated in FIG. 4, one of the general pick up locations 402, such as the general pick-up location 404, is selected. For instance, the buyer, associated with the second user account, selects a particular general location from which the buyer would like to pick up the item.

In operation 660, payment of the item is confirmed. For example, the buyer enters payment information, such as a credit card number of PayPal address, or other form of payment. A transaction is then performed based on a purchase price of the item to obtain funds from the buyer. Once payment of the item is confirmed, operation 670 displays, via the second session, a specific location for pickup of the item. The specific location is obtained based on a mapping between the specific location and the general location selected in operation 650. For example, in some aspects, the specific location displayed in operation 660 is associated with the general location selected in operation 650 via the first user interface displayed in operation 620.

In some aspects, once the specific location is obtained in operation 670, an autonomous vehicle may be controlled to visit the specific location. For example, in some aspects, a web based service interface may be available to command one or more autonomous vehicles to pick up items purchased via ecommerce. Once appropriate authentication is provided to the web-based service interface, an autonomous vehicle may be dispatched to the selected location. A delivery location for the item may also be provided to the web based service interface. Such a service could allow autonomous delivery of locally purchased items.

In some embodiments of operation 670, location updates may be received from a buyer's mobile device. The buyer may be associated with the second session. For example, the second user account may be identified as a buyer account for the item. Operation 670 may determine a distance between a location indicated by one or more of the location updates, and the specific location selected for pick up of the item. If the distance is below a threshold, operation 670 may determine the pick up of the item is complete. Operation 670 may mark the item in a database supporting the item listing system as picked up. Alternatively, upon determining the distance has transgressed or is otherwise below a distance threshold, the buyer may be prompted, via their mobile device, to confirm pick up of the item. Upon confirmation received from the buyer, the item may be marked as picked up in the item listing system.

Figure 7:
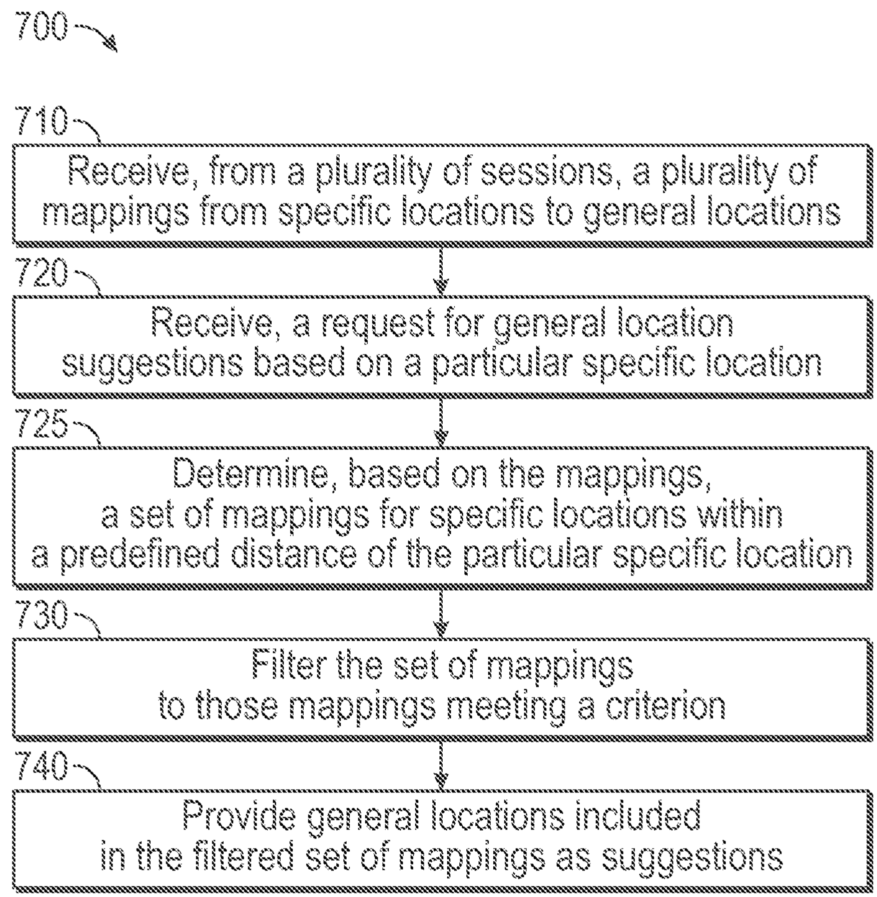
FIG. 7 is a flowchart of a method for crowdsourcing a general location.

FIG. 7 is a flowchart of a method 700 for crowdsourcing a general location. In some aspects, one or more of the functions discussed below with respect to FIG. 7 may be performed by the machine 1000. For example, instructions 908 and/or 1016 may configure one or more hardware processors 906/1010 to perform one or more of the functions discussed below with respect to FIG. 7 and method 700. In some aspects, one or more of the functions discussed below may be performed by instructions stored in the suggestion engine 530.

In operation 710, a plurality of mappings is received from a plurality of sessions. Each of the plurality of sessions may be established based on different user credentials for different user accounts. In other words, the mappings are created by different users, which may, in some embodiments, be sellers within an item listing system. The sellers may provide the mappings via a user interface, such as user interface 200 and/or 300 discussed above with respect to FIGS. 2 and 3 respectively.

In operation 720, a request for general location suggestions is received. The request may be generated by a user interface, such as the user interface 300, discussed above. For example, the user interface attempts to display suggestions for a general location based on a particular specific location. As illustrated in FIG. 3, the suggestions 306 is based on the specific location 308. Thus, in some aspects, before the user interface (e.g., user interface 300) can display suggestions for a general location (e.g., general location 306), the user interface generates the request for suggestions based on a specific location (e.g., specific location 308). In some aspects, the request is received as an AJAX request from a web page implementing the user interface (e.g., user interface 300).

In operation 725, a set of mappings is identified. The identified mappings include specific locations within a predefined distance of the particular specific location indicated in the request. In some aspects, the predefined distance is any distance between ½ a mile and ten (10) miles. In some aspects, the predefined distance varies by specific location. For example, some implementations may store an association between a zip code or zip code range and the predefined distance. For example, in rural areas, a larger predefined distance may be more appropriate than in urban areas.

In some aspects, the mappings may be clustered based on distances between specific locations of the mappings. For example, specific locations within a threshold distance of each other may be assigned to the same cluster.

Other aspects may not operate based on a predefined distance, but instead select a predefined number of mappings that are closest to the specific location. For example, in some aspects, mappings are ranked by a distance from a specific location included in the mapping to the particular specific location. A maximum predefined number of top ranked mappings are then selected. The top ranked mappings are those with the shortest distances.

In operation 730, the mappings identified in operation 725 are filtered to those mappings meeting a criterion. In some embodiments that cluster the mappings as described above, mappings within a particular cluster are preserved while other mappings are filtered out. In some aspects, the filtering is generally based on general location(s) included in the mappings. In some aspects, the criterion is met based on a numerosity or number of times a general location of the mappings is present or repeats within the plurality of mappings (e.g., operation 710) and/or the determined mappings (e.g., mappings 725). In some embodiments, if the numerosity is below an absolute threshold, the respective mappings including that general location are filtered out. In some other aspects, a relative numerosity of each general location present in the mapping may be evaluated. In these embodiments, a top number or percentage of most frequently occurring general locations (up to some predefined limit such as three, four, five, six, seven, eight, nine, or ten general locations to be used as suggestions) may not be filtered out, and other mappings not included in the top number or percentage are filtered out.

In operation 740, the general locations of the remaining mappings are provided as suggestions. In example embodiments, the suggestions are provided via a user interface, such as the user interface 300 discussed above.

Figure 8:
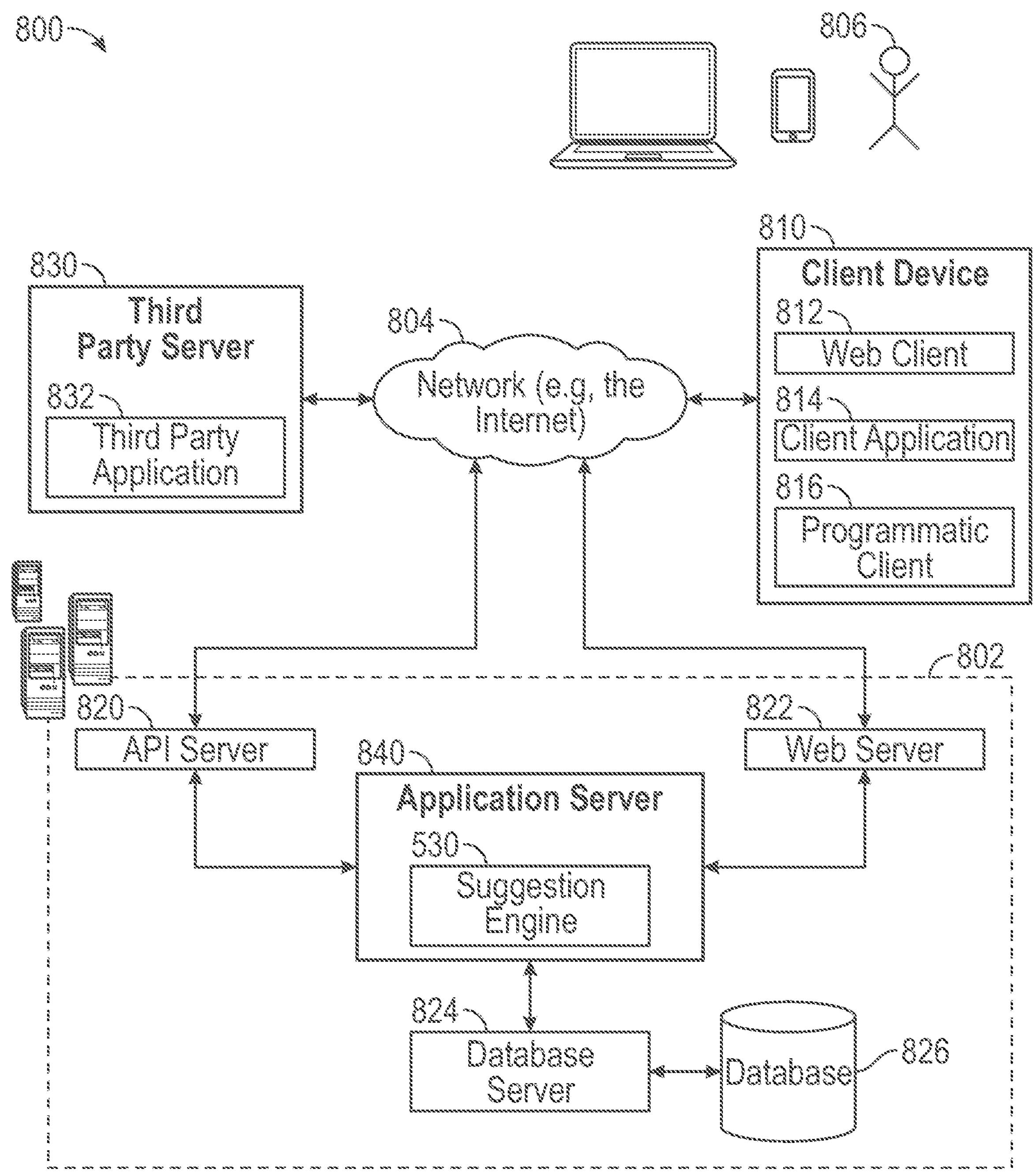
FIG. 8 is a block diagram of an exemplary client-server-based architecture.

FIG. 8 is a block diagram of an exemplary client-server-based architecture 800. While FIG. 8 depicts the client-server-based architecture 800, the present inventive subject matter is, of course, not limited to such an architecture, and could equally well find application in an event-driven, distributed, or peer-to-peer architecture system, for example. Further, to avoid obscuring the inventive subject matter with unnecessary detail, various functional components that are not germane to conveying an understanding of the inventive subject matter have been omitted from FIG. 8. Moreover, it shall be appreciated that although the various functional components illustrated in FIG. 8 are discussed in a singular sense, multiple instances of any one of the various functional components may be employed.

A content publication platform 802, in the example form of a network-based system, provides server-side functionality via a network 804 (e.g., the Internet or wide area network (WAN)) to one or more client devices 810. In some aspects, the content publication platform 802 may implement an item listing system. The item listing system may provide for the publication of ecommerce listings that facilitate providing items for sale.

FIG. 8 illustrates, for example, a web client 812 (e.g., a browser), a client application 814, and a programmatic client 816 executing on the client device 810. The client device 810 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the content publication platform 802. In some embodiments, the client device 810 comprises a display module (not shown) to display information (e.g., in the form of user interfaces). In further embodiments, the client device 810 comprises one or more of a touch screens, accelerometers, gyroscopes, cameras, microphones, global positioning system (GPS) devices, and so forth. In one embodiment, the content publication platform 802 is a network-based marketplace that publishes publications (e.g., web documents) comprising item listings of products available on the network-based marketplace.

One or more users 806 may be a person, a machine, or other means of interacting with client device 810. In example embodiments, the user 806 is not part of the client-server-based architecture 800, but interacts with the client-server-based architecture 800 via the client device 810 or another means. For example, the user 806 may provide input (e.g., touch screen input or alphanumeric input) to the client device 810, and the input is communicated to the content publication platform 802 via a network 804. In this instance, the content publication platform 802, in response to receiving the input from the user 806, communicates information (e.g., user interfaces) to the client device 810 via the network 804 to be presented to the user 806. In this way, the user 806 can interact with the content publication platform 802 using the client device 810.

The client device 810 may include one or more client applications 814 (also referred to as "apps") such as, but not limited to, a web browser, messaging application, electronic mail (email) application, an e-commerce site application (also referred to as a marketplace application), and the like. In some embodiments, if the e-commerce site application is included in the client device 810, then this application is configured to locally provide the user interface and at least some of the functionalities with the client application 814 configured to communicate with the content publication platform 802, on an as needed basis, for data or processing capabilities not locally available (e.g., access to a database of items available for sale, to authenticate the user 806, to verify a method of payment). Conversely if the e-commerce site application is not included in the client device 810, the client device 810 may use its web browser to access the e-commerce site (or a variant thereof) hosted on the content publication platform 102.

One or more portions of network 804 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

An application program interface (API) server 820 and a web server 822 are coupled to, and provide programmatic and web interfaces respectively to an application server 840. The application server 840 hosts the suggestion engine 530, which may be embodied as hardware, software, firmware, or any combination thereof.

The application server 840 is, in turn, shown coupled to a database server 824 that facilitate access to database 826. In an example embodiment, the database 826 is a storage device that stores information such as specific pick up locations and generalized pick up locations retrieved by the suggestion engine 530. The databases 826 may also store digital item information in accordance with example embodiments.

Additionally, a third party application 832, executing on a third party server 830, is shown as having programmatic access to the content publication platform 802 via the programmatic interface provided by the API server 820. For example, the third party application 832, utilizing information retrieved from the content publication platform 802, supports one or more features or functions on a website hosted by the third party.

Figure 9:
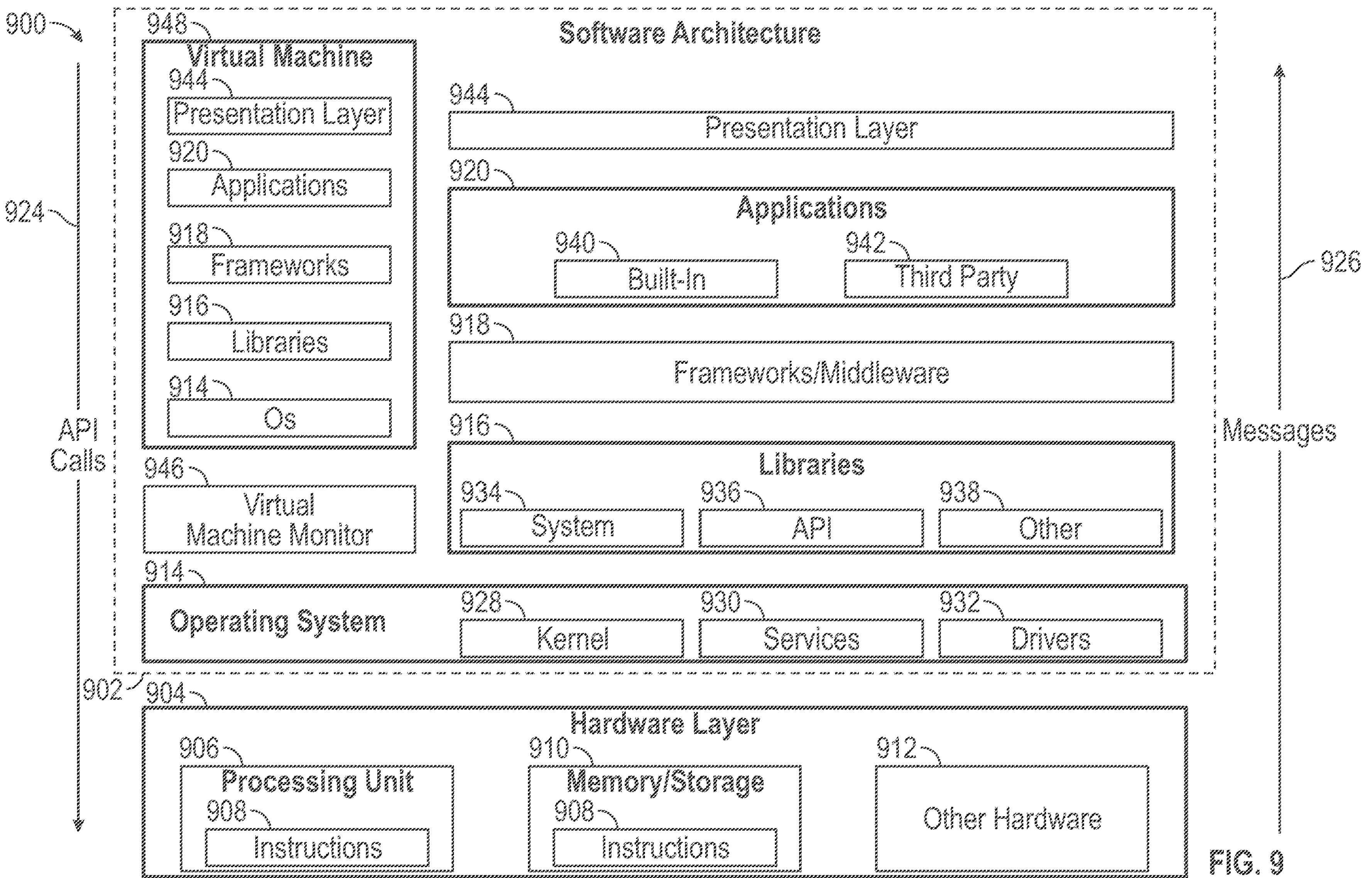
FIG. 9 is a block diagram illustrating a representative software architecture, which may be used in conjunction with various hardware architectures herein.

FIG. 9 is a block diagram 900 illustrating a representative software architecture 902, which may be used in conjunction with various hardware architectures herein described. FIG. 9 is merely a non-limiting example of a software architecture and it will be appreciated that many other architectures may be implemented to facilitate the functionality described herein. The software architecture 902 may be executing on hardware such as machine 1000 of FIG. 10 that includes, among other things, processors 1010, memory 1030, and I/O components 1050. A representative hardware layer 904 is illustrated and can represent, for example, the machine 1000 of FIG. 10. The representative hardware layer 904 comprises one or more processing units 906 having associated executable instructions 908. Executable instructions 908 represent the executable instructions of the software architecture 902, including implementation of the methodologies and modules and so forth described above. Hardware layer 904 also includes memory and/or storage modules 910, which also have executable instructions 908. Hardware layer 904 may also comprise other hardware as indicated by 912 which represents any other hardware of the hardware layer 904, such as the other hardware illustrated as part of machine 800.

In the example architecture of FIG. 9, the software architecture 902 may be conceptualized as a stack of layers where each layer provides particular functionality. For example, the software architecture 902 may include layers such as an operating system 914, libraries 916, frameworks/middleware 918, applications 920 and presentation layer 944. Operationally, the applications 920 and/or other components within the layers may invoke application programming interface (API) calls 924 through the software stack and receive a response, returned values, and so forth illustrated as messages 926 in response to the API calls 924. The layers illustrated are representative in nature and not all software architectures have all layers. For example, some mobile or special purpose operating systems may not provide a frameworks/middleware layer 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930, and/or drivers 932). The libraries 916 may include system 934 libraries (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 520 and other software components/modules.

The frameworks/middleware 918 (also sometimes referred to as "middleware) may provide a higher-level common infrastructure that may be utilized by the applications 920 and/or other software components/modules. For example, the frameworks 918 may provide various graphic user interface (GUI) functions, high-level resource management, high-level location services, and so forth. The frameworks 918 may provide a broad spectrum of other APIs that may be utilized by the applications 920 and/or other software components/modules, some of which may be specific to a particular operating system or platform.

The applications 920 includes built-in applications 940 and/or third party applications 942. Examples of representative built-in applications 940 may include, but are not limited to, a contacts application, a browser application, a book reader application, a location application, a media application, a messaging application, and/or a game application. Third party applications 942 may include any of the built in applications as well as a broad assortment of other applications. In a specific example, the third party application 942 (e.g., an application developed using the Android™ or iOS™ software development kit (SDK) by an entity other than the vendor of the particular platform) may be mobile software running on a 'mobile operating system such as iOS™, Android™, Windows® Phone, or other mobile operating systems. In this example, the third party application 942 may invoke the API calls 936 provided by the mobile operating system such as operating system 914 to facilitate functionality described herein.

The applications 920 may utilize built in operating system functions (e.g., kernel 928, services 930 and/or drivers 932), libraries (e.g., system 934, APIs 936, and other libraries 938), frameworks/middleware 918 to create user interfaces to interact with users of the system. Alternatively, or additionally, in some systems interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware machine (such as the machine of FIG. 8, for example). A virtual machine is hosted by a host operating system (operating system 914 in FIG. 9) and typically, although not always, has a virtual machine monitor 946, which manages the operation of the virtual machine as well as the interface with the host operating system (i.e., operating system 914). A software architecture executes within the virtual machine such as an operating system 914, libraries 916, frameworks/middleware 918, applications 920 and/or presentation layer 944. These layers of software architecture executing within the virtual machine 948 can be the same as corresponding layers previously described or may be different.

Figure 10:
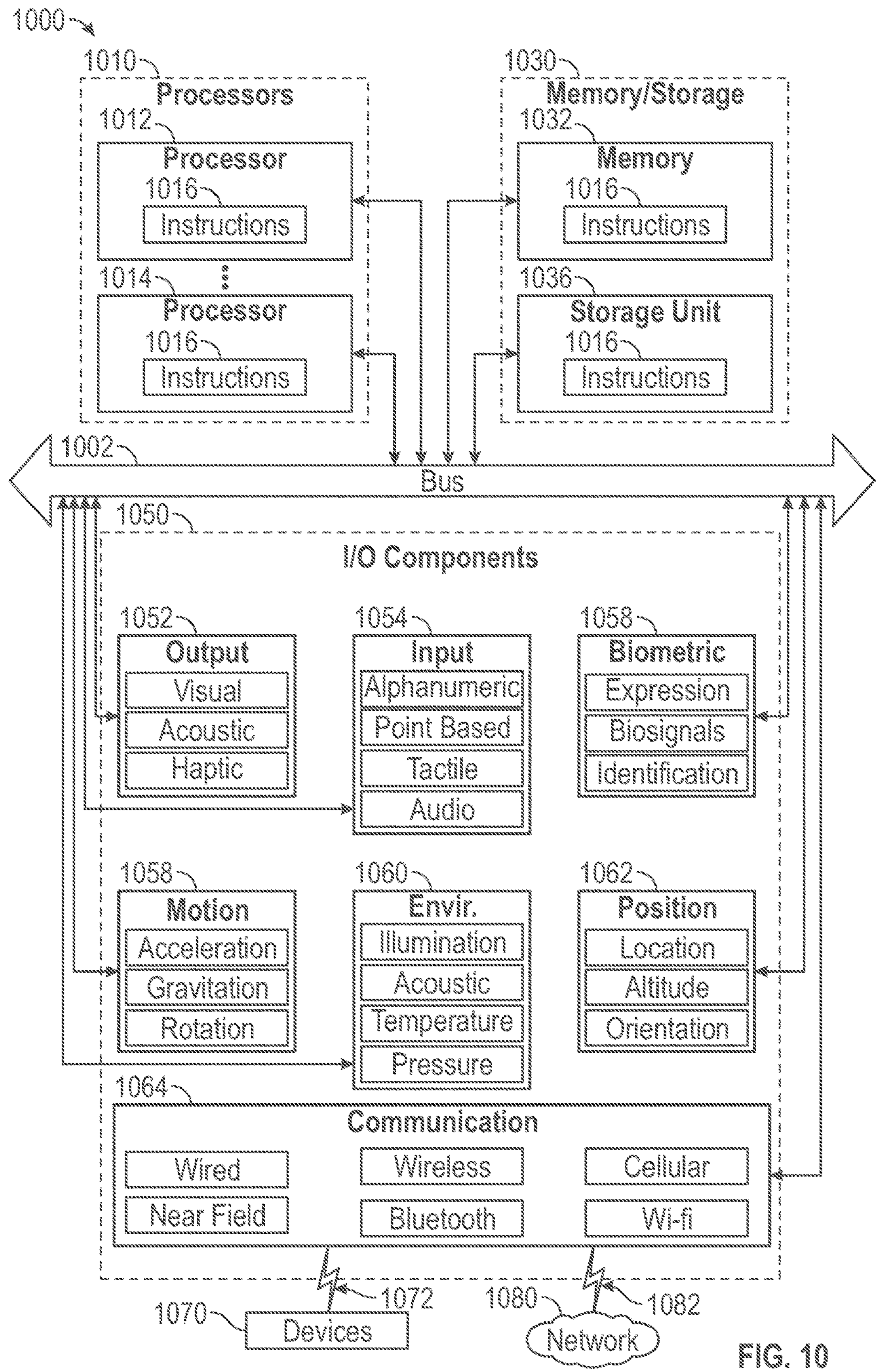
FIG. 10 is a block diagram illustrating components of a machine, according to some example embodiments, able to read instructions from a machine-readable medium and perform any of the methodologies discussed herein.

FIG. 10 is a block diagram illustrating components of the machine 1000, according to some example embodiments, able to read instructions from a machine-readable medium (e.g., a machine-readable storage device) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. These instructions transform the general, non-programmed machine into a particular machine programmed to carry out the described and illustrated methodologies in the manner described herein. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. By way of non-limiting example, the machine 1000 may comprise or correspond to a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory/storage 1030, and I/O components 1050, which may be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include a multi-core processor 1010 that may comprise two or more independent processors (sometimes referred to as "cores") that may execute instructions contemporaneously. Although FIG. 10 shows multiple processors, the machine 1000 may include a single processor with a single core, a single processor with multiple cores (e.g., a multi-core processor), multiple processors with a single core, multiple processors with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of the processors 1010 are examples of machine-readable media.

As used herein, "machine-readable medium" means a device able to store instructions and data temporarily or permanently, and may include, but is not limited to, randomaccess memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine (e.g., processors 1010), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se. In example embodiments, a machine-readable medium may also be referred to as a "machine-readable storage device."

Executable Instructions and Machine-Storage Medium

The various memories (i.e., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 622 specifically exclude carrier waves, modulated data signals, transitory signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), acoustic sensor components (e.g., one or more microphones that detect background noise), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072 respectively. For example, the communication components 1064 may include a network interface component or other suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 may detect identifiers or include components operable to detect identifiers. For example, the communication components 1064 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

In various example embodiments, one or more portions of the network 1080 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

Example 1 is a system comprising: hardware processing circuitry; and a hardware memory storing instructions that when executed by the hardware processing circuitry configure the hardware processing circuitry to perform operations comprising: establishing a first session based on first authentication credentials; obtaining, via a configuration interface for the first session, one or more pick up times and specific pick up locations for an item; obtaining, via the configuration interface for the first session, a generalized location for each of the one or more specific pick up locations; storing a mapping between each of the specific pick up locations and its respective generalized location; establishing a second session based on second authentication credentials; causing display, via the second session, of an online listing for the item; causing display, via the second session, of the one or more candidate pick up times and one or more generalized locations mapped to each of the one or more specific pick up locations; receiving, via the second session, a selection of one of the candidate pick up times and one of the generalized locations mapped to one of the specific pick up locations; receiving, via the second session, payment for the item; and in response to receiving the payment for the item, causing display, via the second session, of the one specific pick up location mapped to the selected generalized location.

In Example 2, the subject matter of Example 1 optionally includes receiving location updates of a buyer of the item via the second session, and marking the item as picked up in the item listing system in response to the location updates indicating the buyer is located at the selected pick up location.

In Example 3, the subject matter of any one or more of Examples 1-2 optionally include the operations further comprising scheduling an autonomous vehicle to arrive at the specific pick up location at the selected one of the candidate pick up times.

In Example 4, the subject matter of any one or more of Examples 1-3 optionally include the operations further comprising causing display of a checkout user interface, the checkout user interface including a description of the item, an image of the item, and a user interface control, wherein the display of the one or more candidate pick up times and the generalized locations mapped to the one or more specific pick up locations is in response to selection of the user interface control.

In Example 5, the subject matter of Example 4 optionally includes the operations further comprising: receiving, via a plurality of sessions established based on a corresponding plurality of authentication credentials different from the second authentication credentials, a corresponding plurality of generalized locations mapped to a plurality of specific pick up locations; storing the plurality of generalized locations and mapped specific pick up locations to a database; clustering the plurality of specific pick up locations based on distances between the specific pick up locations; in response to receiving a specific pick up location from the configuration interface of the first session: identifying a particular cluster based on a distance between the received specific pick up location and specific pick up locations in the particular cluster, and suggesting, via the second session, one or more of the generalized locations of the specific pick up locations within the particular cluster based on a similarity score of the one or more generalized locations, the suggesting comprising causing display of the one or more generalized locations in response to selection of the user interface control.

In Example 6, the subject matter of Example 5 optionally includes the operations further comprising filtering the generalized locations that are mapped to specific pick up locations of a particular cluster based on a relative numericity of each generalized location, wherein the suggesting is based on the filtered generalized locations.

In Example 7, the subject matter of any one or more of Examples 5-6 optionally include the operations further comprising: ranking general locations mapped to specific pick up locations of a particular cluster based on a numericity of each generalized version within the cluster, and selecting a predefined percentage of highest ranked general locations up to a defined limit, wherein the suggesting is based on the selected highest ranked general locations.

Example 8 is a method comprising: establishing, via hardware processing circuitry, a first session based on first authentication credentials; obtaining, via a configuration interface for the first session, one or more pick up times and specific pick up locations for an item; obtaining, via the configuration interface for the first session, a generalized location for each of the one or more specific pick up locations; storing, via the hardware processing circuitry, a mapping between each of the specific pick up locations and its respective generalized location; establishing, via the hardware processing circuitry, a second session based on second authentication credentials; causing display, via the hardware processing circuitry and the second session, of an online listing for the item; causing display, via the hardware processing circuitry and the second session, of a user interface displaying the one or more candidate pick up times and one or more generalized locations mapped to each of the one or more specific pick up locations; receiving, via the hardware processing circuitry and the second session, a selection of one of the candidate pick up times and one of the generalized locations mapped to one of the specific pick up locations; receiving, via the hardware processing circuitry and the second session, payment for the item; and in response to receiving the payment for the item, causing display, via the second session, of the one specific pick up location mapped to the selected generalized location.

In Example 9, the subject matter of Example 8 optionally includes receiving location updates of a buyer of the item via the second session, and marking the item as picked up in the item listing system in response to the location updates indicating the buyer is located at the selected pick up location.

In Example 10, the subject matter of any one or more of Examples 8-9 optionally include the operations further comprising scheduling an autonomous vehicle to arrive at the specific pick up location at the selected one of the candidate pick up times.

In Example 11, the subject matter of any one or more of Examples 8-10 optionally include the operations further comprising causing display of a checkout user interface, the checkout user interface including a description of the item, an image of the item, and a user interface control, wherein the display of the one or more candidate pick up times and the general locations mapped to the one or more specific pick up locations is in response to selection of the user interface control.

In Example 12, the subject matter of Example 11 optionally includes the operations further comprising: receiving, via a plurality of sessions established based on a corresponding plurality of authentication credentials different from the second authentication credentials, a corresponding plurality of generalized locations mapped to a plurality of specific pick up locations; storing the plurality of generalized locations and mapped specific pick up locations to a database; clustering the plurality of specific pick up locations based on distances between the specific pick up locations; in response to receiving a specific pick up location from the configuration interface of the first session: identifying a particular cluster based on a distance between the received specific pick up location and specific pick up locations in the particular cluster, and suggesting, via the second session, one or more of the generalized locations of the specific pick up locations within the particular cluster based on a similarity score of the one or more generalized locations, the suggesting comprising causing display of the one or more generalized locations in response to selection of the user interface control.

In Example 13, the subject matter of Example 12 optionally includes the operations further comprising filtering the general locations that are mapped to specific pick up locations of a particular cluster based on a relative numericity of each generalized location, wherein the suggesting is based on the filtered general locations.

In Example 14, the subject matter of any one or more of Examples 12-13 optionally include the operations further comprising: ranking general locations mapped to specific pick up locations of a particular cluster based on a numericity of each generalized version within the cluster, and selecting a predefined percentage of highest ranked general locations up to a defined limit, wherein the suggesting is based on the selected highest ranked general locations.

In Example 15, the subject matter of any one or more of Examples 8-14 optionally include wherein the specific location mapped to the selected generalized location is not displayed in the second session until after the payment is received.

Example 16 is a non-transitory computer readable storage medium comprising instructions that when executed by hardware processing circuitry configure the hardware processing circuitry to perform operations comprising: establishing a first session based on first authentication credentials; obtaining, via a configuration interface for the first session, one or more pick up times and specific pick up locations for an item; obtaining, via the configuration interface for the first session, a generalized location for each of the one or more specific pick up locations; storing a mapping between each of the specific pick up locations and its respective generalized location; establishing a second session based on second authentication credentials; causing display, via the second session, of an online listing for the item; causing display, via the second session, of a user interface displaying the one or more candidate pick up times and one or more generalized locations mapped to each of the one or more specific pick up locations; receiving, via the second session, a selection of one of the candidate pick up times and one of the generalized locations mapped to one of the specific pick up locations; receiving, via the second session, payment for the item; and in response to receiving the payment for the item, causing display, via the second session, of the one specific pick up location mapped to the selected generalized location.

In Example 17, the subject matter of Example 16 optionally includes receiving location updates of a buyer of the item via the second session, and marking the item as picked up in the item listing system in response to the location updates indicating the buyer is located at the selected pick up location.

In Example 18, the subject matter of any one or more of Examples 16-17 optionally include the operations further comprising scheduling an autonomous vehicle to arrive at the specific pick up location at the selected one of the candidate pick up times.

In Example 19, the subject matter of any one or more of Examples 16-18 optionally include the operations further comprising causing display of a checkout user interface, the checkout user interface including a description of the item, an image of the item, and a user interface control, wherein the display of the one or more candidate pick up times and the general locations mapped to the one or more specific pick up locations is in response to selection of the user interface control.

In Example 20, the subject matter of any one or more of Examples 16-19 optionally include the operations further comprising: receiving, via a plurality of sessions established based on a corresponding plurality of authentication credentials different from the second authentication credentials, a corresponding plurality of generalized locations mapped to a plurality of specific pick up locations; storing the plurality of generalized locations and mapped specific pick up locations to a database; clustering the plurality of specific pick up locations based on distances between the specific pick up locations; in response to receiving a specific pick up location from the configuration interface of the first session: identifying a particular cluster based on a distance between the received specific pick up location and specific pick up locations in the particular cluster, and suggesting, via the second session, one or more of the generalized locations of the specific pick up locations within the particular cluster based on a similarity score of the one or more generalized locations, the suggesting comprising causing display of the one or more generalized locations in response to selection of the user interface control.

We claim:

1. A system comprising:

hardware processing circuitry; and a hardware memory storing instructions that when executed by the hardware processing circuitry configure the hardware processing circuitry to perform operations comprising:

establishing a first session based on a first authentication credential with a first user;

receiving a general location associated with a first specific location from the first user;

establishing a second session based on a second authentication credential with a second user;

receiving a second specific location from the second user, the first specific location being a predefined distance from the second specific location; and suggesting the general location to the first user for the second specific location based on the first specific location being within a predefined distance from the second specific location.

2. The system of claim 1, the operations further comprising establishing a third session based on a third authentication credential with a third user;

receiving a third specific location from the third user; and suggesting the general location to the user for the second specific location based on the first specific location being within a predefined distance from the second specific location and the third specific location.

3. The system of claim 1, wherein the first and second authentication credentials identify accounts that are seller accounts.

4. The system of claim 3, the operations further comprising:

displaying a user interface in response to determining that the first identification credential identifies a seller account; and receiving input at the user interface mapping the first specific location.

5. The system of claim 1, the operations further comprising:

searching a database for additional specific locations with the predefined distance from the general location; and suggesting the general location based on the additional specific locations.

6. The system of claim 5, the operations further comprising:

determining a number of times the general location occurs;

comparing the number of times with a threshold; and suggesting the general location when the number of times exceeds the threshold.

7. The system of claim 1, the operations further comprising scheduling an autonomous vehicle to arrive at the specific pick up location.

8. A method comprising:

establishing a first session based on a first authentication credential with a first user;

receiving a general location associated with a first specific location from the first user;

establishing a second session based on a second authentication credential with a second user;

receiving a second specific location from the second user, the first specific location being a predefined distance from the second specific location; and suggesting the general location to the first user for the second specific location based on the first specific location being within a predefined distance from the second specific location.

9. The method of claim 8, the operations further comprising establishing a third session based on a third authentication credential with a third user;

receiving a third specific location from the third user; and suggesting the general location to the user for the second specific location based on the first specific location being within a predefined distance from the second specific location and the third specific location.

10. The method of claim 8, wherein the first and second authentication credentials identify accounts that are seller accounts.

11. The method of claim 10, the method further comprising:

displaying a user interface in response to determining that the first identification credential identifies a seller account; and receiving input at the user interface mapping the first specific location.

12. The method of claim 8, the method further comprising:

searching a database for additional specific locations with the predefined distance from the general location;

suggesting the general location based on the additional specific locations;

determining a number of times the general location occurs;

comparing the number of times with a threshold; and suggesting the general location when the number of times exceeds the threshold.

13. The method of claim 8, the method further comprising scheduling an autonomous vehicle to arrive at the specific pick up location.

14. A non-transitory computer readable storage medium comprising instructions that when executed by hardware processing circuitry configure the hardware processing circuitry to perform operations comprising:

establishing a first session based on a first authentication credential with a first user;

receiving a general location associated with a first specific location from the first user;

establishing a second session based on a second authentication credential with a second user;

receiving a second specific location from the second user, the first specific location being a predefined distance from the second specific location; and suggesting the general location to the first user for the second specific location based on the first specific location being within a predefined distance from the second specific location.

15. The non-transitory computer readable storage medium of claim 14, the operations further comprising establishing a third session based on a third authentication credential with a third user;

receiving a third specific location from the third user; and suggesting the general location to the user for the second specific location based on the first specific location being within a predefined distance from the second specific location and the third specific location.

16. The non-transitory computer readable storage medium of claim 14, wherein the first and second authentication credentials identify accounts that are seller accounts.

17. The non-transitory computer readable storage medium of claim 16, the operations further comprising:

displaying a user interface in response to determining that the first identification credential identifies a seller account; and receiving input at the user interface mapping the first specific location.

18. The non-transitory computer readable storage medium of claim 14, the operations further comprising:

searching a database for additional specific locations with the predefined distance from the general location; and suggesting the general location based on the additional specific locations.

19. The non-transitory computer readable storage medium of claim 18, the operations further comprising:

determining a number of times the general location occurs;

comparing the number of times with a threshold; and suggesting the general location when the number of times exceeds the threshold.

20. The non-transitory computer readable storage medium of claim 14, the operations further comprising scheduling an autonomous vehicle to arrive at the specific pick up location.

* * * * *